United States Patent
Heyns

(10) Patent No.: US 10,963,487 B2
(45) Date of Patent: Mar. 30, 2021

(54) ALGORITHM TO APPLY A PREDICATE TO DATA SETS

(71) Applicant: BRYTLYT LIMITED, Maidstone (GB)

(72) Inventor: Richard Heyns, Kent (GB)

(73) Assignee: BRYTLYT LIMITED, Maidstone (GB)

(*) Notice: Subject to any disclaimer, the term of this patent is extended or adjusted under 35 U.S.C. 154(b) by 545 days.

(21) Appl. No.: 15/030,785

(22) PCT Filed: Oct. 21, 2014

(86) PCT No.: PCT/EP2014/072583
§ 371 (c)(1),
(2) Date: Apr. 20, 2016

(87) PCT Pub. No.: WO2015/059161
PCT Pub. Date: Apr. 30, 2015

(65) Prior Publication Data
US 2016/0253405 A1     Sep. 1, 2016

(30) Foreign Application Priority Data

Oct. 21, 2013  (GB) ..................... 1318582

(51) Int. Cl.
*G06F 16/28* (2019.01)
*G06F 16/2457* (2019.01)
(Continued)

(52) U.S. Cl.
CPC ........ *G06F 16/285* (2019.01); *G06F 16/2457* (2019.01); *G06F 16/24544* (2019.01); *G06F 17/18* (2013.01)

(58) Field of Classification Search
CPC ......... G06F 17/30522; G06F 17/30466; G06F 16/2457; G06F 16/24544; G06F 16/285
See application file for complete search history.

(56) References Cited

U.S. PATENT DOCUMENTS

| 7,890,549 B2 * | 2/2011 | Elad ...................... G06Q 30/02 706/11 |
| 2006/0129595 A1 * | 6/2006 | Chen .................... G06F 16/283 707/999.102 |

(Continued)

OTHER PUBLICATIONS

Anonymous: "Divide and conquer algorithms—Wikipedia, the free encyclopedia", Sep. 23, 2013 (Sep. 23, 2013), XP55168860, Retrieved from the internet: URL:http://en.wikipedia.org/w/index.php?title=divide_and_conquer_algorithms&oldid=57418652.

(Continued)

*Primary Examiner* — Kannan Shanmugasundaram
(74) *Attorney, Agent, or Firm* — Thorpe North & Western

(57) ABSTRACT

The present invention relates to a method and apparatus for analysing a pair of data sets with respect to a predicate, the predicate having a predicate criterion, each data set comprising one or more elements sorted according to the predicate criterion. The invention comprises recursive partitioning of the data sets in a parallel manner across multiple computing cores until a base case is reached. The invention is particularly suited for carrying out join, filter and sort operations on large data sets within database management systems.

15 Claims, 21 Drawing Sheets

(51) Int. Cl.
*G06F 16/2453* (2019.01)
*G06F 17/18* (2006.01)

(56) References Cited

U.S. PATENT DOCUMENTS

| | | | |
|---|---|---|---|
| 2007/0024919 A1* | 2/2007 | Wong | G06F 9/5027 707/E17.01 |
| 2014/0074818 A1* | 3/2014 | Barber | G06F 17/30315 707/714 |
| 2014/0195542 A1* | 7/2014 | Larson | G06F 17/30321 707/741 |

OTHER PUBLICATIONS

Hellerstein, J.M. et al: "Predicate Migration: Optimizing Queries with Expensive Predicates", SIGMOD Record, ACM, New York, NY, US, vol. 22, No. 2, Jun. 1, 1993 (Jun. 1, 1993), pp. 267-276, XP000418207, ISSN: 0163-5808, DOI:10.1145/170036.170078.

* cited by examiner

Customer Data

| | customer id | name | loyalty |
|---|---|---|---|
| group Aa | | | |
| 1 | 20 | Brenda | left |
| 2 | 31 | Sarah | premium |
| 3 | 42 | Dave | left |
| 4 | 43 | Vicky | new |
| 5 | 45 | Paul | left |
| 6 | 46 | Mary | new |
| 7 | 52 | Georgia | core |
| 8 | 72 | Vanessa | core |
| 9 | 79 | Karl | left |
| 10 | 101 | Yvonne | premium |
| 11 | 102 | Chris | new |
| 12 | 103 | Winifred | premium |
| 13 | 115 | Michael | new |
| 14 | 130 | Adam | left |
| 15 | 137 | Anthony | left |
| 16 | 141 | Gerry | loyal |
| group Ab | | | |
| 17 | 147 | Richard | loyal |
| 18 | 154 | Charlotte | core |
| 19 | 155 | Frank | left |
| 20 | 159 | Zoe | loyal |
| 21 | 172 | Louise | premium |
| 22 | 182 | Cheryl | loyal |
| 23 | 195 | Alan | core |
| 24 | 223 | Sylve | left |
| 25 | 240 | Brian | core |
| 26 | 244 | Pieter | premium |
| 27 | 247 | Liz | new |
| 28 | 247 | Mike | core |
| 29 | 251 | Mark | premium |
| 30 | 252 | Sally | new |
| 31 | 273 | Georgia | premium |
| 32 | 287 | Anna | premium |

Sales Data

| | customer id | qty |
|---|---|---|
| group Ba | | |
| | 4 | 2 |
| | 15 | 2 |
| | 20 | 4 |
| | 20 | 4 |
| | 31 | 4 |
| | 68 | 1 |
| | 101 | 3 |
| | 132 | 2 |
| | 152 | 2 |
| | 154 | 2 |
| | 159 | 2 |
| | 223 | 2 |
| | 229 | 1 |
| | 230 | 1 |
| | 240 | 2 |
| | 241 | 1 |
| group Bb | | |
| | 243 | 3 |
| | 245 | 3 |
| | 247 | 1 |
| | 273 | 2 |
| | 278 | 1 |
| | 329 | 1 |
| | 338 | 2 |
| | 344 | 4 |
| | 347 | 1 |
| | 358 | 2 |
| | 391 | 1 |
| | 409 | 4 |
| | 523 | 1 |
| | 526 | 1 |
| | 529 | 3 |

Fig. 9 group Ac

| | | | |
|---|---|---|---|
| 33 | 300 | Hannah | new |
| 34 | 303 | John | core |
| 35 | 338 | Roy | premium |
| 36 | 341 | Nel | premium |
| 37 | 358 | Tony | premium |
| 38 | 368 | Barbara | new |
| 39 | 373 | Craig | loyal |
| 40 | 398 | Malcolm | premium |
| 41 | 409 | Donovan | loyal |
| 42 | 435 | Rebecca | loyal |
| 43 | 443 | Martin | loyal |
| 44 | 444 | Brian | new |
| 45 | 454 | Tracey | core |
| 46 | 462 | Neil | core |
| 47 | 464 | Emlyn | loyal |
| 48 | 469 | Susan | left | group Ad

| | | | |
|---|---|---|---|
| 49 | 494 | Vincent | loyal |
| 50 | 522 | Helen | loyal |
| 51 | 523 | Chris | new |
| 52 | 523 | Loray | core |
| 53 | 535 | Andrew | new |
| 54 | 545 | Greg | core |
| 55 | 556 | Jennifer | loyal |
| 56 | 571 | John | premium |
| 57 | 581 | Robert | left |
| 58 | 584 | Tristen | new |
| 59 | 585 | Brent | left |
| 60 | 592 | Martin | loyal |
| 61 | 593 | Katy | left |
| 62 | 595 | David | core |

Fig. 9 (continued)

| customers | sales | interaction |
|---|---|---|
| group Aa | group Ba | yes |
| group Aa | group Bb | no |
| group Ab | group Ba | yes |
| group Ab | group Bb | yes |
| group Ac | group Ba | no |
| group Ac | group Bb | yes |
| group Ad | group Ba | no |
| group Ad | group Bb | yes |

Fig. 10

Customer Data

| | customer id | name | loyalty |
|---|---|---|---|
| group Aa1 | 20 | Brenda | left |
| | 31 | Sarah | premium |
| | 42 | Dave | left |
| | 43 | Vicky | new |
| group Aa2 | 45 | Paul | left |
| | 46 | Mary | new |
| | 52 | Georgia | core |
| | 72 | Vanessa | core |
| group Aa3 | 79 | Karl | left |
| | 101 | Yvonne | premium |
| | 102 | Chris | new |
| | 103 | Winifred | premium |
| group Aa4 | 115 | Michael | new |
| | 130 | Adam | left |
| | 137 | Anthony | left |
| | 141 | Gerry | loyal |
| group Ab1 | 147 | Richard | loyal |
| | 154 | Charlotte | core |
| | 155 | Frank | left |
| | 159 | Zoe | loyal |
| group Ab2 | 172 | Louise | premium |
| | 182 | Cheryl | loyal |
| | 195 | Alan | core |
| | 223 | Sylve | left |
| group Ab3 | 240 | Brian | core |
| | 244 | Pieter | premium |
| | 247 | Liz | new |
| | 247 | Mike | core |
| group Ab4 | 251 | Mark | premium |
| | 252 | Sally | new |
| | 273 | Georgia | premium |
| | 287 | Anna | premium |

Sales Data

| | customer id | qty |
|---|---|---|
| group Ba1 | 4 | 2 |
| | 15 | 2 |
| | 20 | 4 |
| | 20 | 4 |
| group Ba2 | 31 | 4 |
| | 68 | 1 |
| | 101 | 3 |
| | 132 | 2 |
| group Ba3 | 152 | 2 |
| | 154 | 2 |
| | 159 | 2 |
| | 223 | 2 |
| group Ba4 | 229 | 1 |
| | 230 | 1 |
| | 240 | 2 |
| | 241 | 1 |
| group Bb1 | 243 | 3 |
| | 245 | 3 |
| | 247 | 1 |
| | 273 | 2 |
| group Bb2 | 278 | 1 |
| | 329 | 1 |
| | 338 | 2 |
| | 344 | 4 |
| group Bb3 | 347 | 1 |
| | 358 | 2 |
| | 391 | 1 |
| | 409 | 4 |
| group Bb4 | 523 | 1 |
| | 526 | 1 |
| | 529 | 3 |

Fig. 11

| | | |
|---|---|---|
| group Ac1 | 300 Hannah | new |
| | 303 John | core |
| | 338 Roy | premium |
| | 341 Nel | premium |
| group Ac2 | 358 Tony | premium |
| | 368 Barbara | new |
| | 373 Craig | loyal |
| | 398 Malcolm | premium |
| group Ac3 | 409 Donovan | loyal |
| | 435 Rebecca | loyal |
| | 443 Martin | loyal |
| | 444 Brian | new |
| group Ac4 | 454 Tracey | core |
| | 462 Neil | core |
| | 464 Emlyn | loyal |
| | 469 Susan | left |

| | | |
|---|---|---|
| group Ad1 | 494 Vincent | loyal |
| | 522 Helen | loyal |
| | 523 Chris | new |
| | 523 Loray | core |
| group Ad2 | 535 Andrew | new |
| | 545 Greg | core |
| | 556 Jennifer | loyal |
| | 571 John | premium |
| group Ad3 | 581 Robert | left |
| | 584 Tristen | new |
| | 585 Brent | left |
| | 592 Martin | loyal |
| group Ad4 | 593 Katy | left |
| | 595 David | core |

Fig. 11 (cont)

| customers | sales |
|---|---|
| group Aa1 | group Ba1 |
| group Aa1 | group Ba2 |
| group Aa2 | group Ba2 |
| group Aa3 | group Ba2 |
| group Aa4 | group Ba2 |

| | |
|---|---|
| group Ab1 | group Ba3 |
| group Ab2 | group Ba3 |
| group Ab3 | group Ba4 |

| | |
|---|---|
| group Ab3 | group Bb1 |
| group Ab4 | group Bb1 |
| group Ab4 | group Bb2 |

| | |
|---|---|
| group Ac1 | group Bb2 |
| group Ac2 | group Bb2 |
| group Ac2 | group Bb3 |
| group Ac3 | group Bb4 |

| | |
|---|---|
| group Ad1 | group Bb4 |

Fig. 12

|  |  | customer id | loyalty | sales qty |
|---|---|---|---|---|
| group Aa | group Ba1 | 20 | left | 4 |
| group Aa | group Ba1 | 20 | left | 4 |
| group Aa | group Ba2 | 31 | premium | 4 |
| group Ac | group Ba2 | 101 | premium | 3 |
| group Ba | group Ba3 | 154 | core | 2 |
| group Ba | group Ba3 | 159 | LOYAL | 2 |
| group Bb | group Ba3 | 223 | left | 2 |
| group Bc | group Ba4 | 240 | core | 2 |
| group Bc | group Bb1 | 247 | new | 1 |
| group Bd | group Bb1 | 273 | premium | 2 |
| group Ca | group Bb2 | 338 | premium | 2 |
| group Cb | group Bb3 | 358 | premium | 2 |
| group Cd | group Bb3 | 409 | LOYAL | 4 |
| group Da | group Bb4 | 523 | new | 1 |

Fig. 13

|   | List A |   | List B |   |
|---|---|---|---|---|
| 1 | group Aa | 1 | group Ba | 2 |
| 2 |  | 3 |  | 7 |
| 3 |  | 5 |  | 14 |
| 4 |  | 7 |  | 19 |
| 5 | group Ab | 18 | group Bb | 33 |
| 6 |  | 22 |  | 36 |
| 7 |  | 27 |  | 43 |
| 8 |  | 39 |  | 45 |
| 9 | group Ac | 40 | group Bc | 49 |
| 10 |  | 45 |  | 56 |
| 11 |  | 50 |  | 66 |
| 12 |  | 59 |  | 70 |
| 13 | group Ad | 76 | group Bd | 84 |
| 14 |  | 80 |  | 86 |
| 15 |  | 82 |  | 93 |
| 16 |  | 94 |  | 98 |

Fig. 14

| List A | List B | Interaction? |  |
|---|---|---|---|
| Aa | Ba | yes | select for merge |
|  | Bb | no |  |
|  | Bc | no |  |
|  | Bd | no |  |
| Ab | Ba | yes | shared with Aa |
|  | Bb | yes | select for merge |
|  | Bc | no |  |
|  | Bd | no |  |
| Ac | Ba | no |  |
|  | Bb | yes | shared with Ab |
|  | Bc | yes | select for merge |
|  | Bd | no |  |
| Ad | Ba | no |  |
|  | Bb | no |  |
|  | Bc | no |  |
|  | Bd | yes | select for merge |

Fig. 15

|          | List A |          | List A |
|----------|--------|----------|--------|
| group Aa | 1      | group Ba | 2      |
|          | 3      |          | 7      |
|          | 5      |          | 14     |
|          | 7      |          | 19     |
| group Ab | 18     | group Bb | 27     |
|          | 22     |          | 30     |
|          | 27     |          | 34     |
|          | 39     |          | 35     |
| group Ac | 40     | group Bc | 34     |
|          | 45     |          | 36     |
|          | 50     |          | 37     |
|          | 59     |          | 38     |
| group Ad | 76     | group Bd | 39     |
|          | 80     |          | 40     |
|          | 82     |          | 41     |
|          | 94     |          | 77     |

Fig. 17

| List A | List B | Interaction? | Shared with: previous? | Shared with: next? | Category 1: Not shrd with previous | Category 2: shrd with previous but not a Cat 1 | Excluded |
|---|---|---|---|---|---|---|---|
| Aa | Ba | yes |  | next | merge |  |  |
|  | Bb | no |  |  |  |  |  |
|  | Bc | no |  |  |  |  |  |
|  | Bd | no |  |  |  |  |  |
| Ab | Ba | yes | previous |  |  |  |  |
|  | Bb | yes |  |  | merge |  |  |
|  | Bc | yes |  | next |  |  |  |
|  | Bd | yes |  |  |  |  | Bc |
| Ac | Ba | no |  |  |  |  |  |
|  | Bb | no |  |  |  |  |  |
|  | Bc | no |  |  |  |  |  |
|  | Bd | yes | previous | next |  |  |  |
| Ad | Ba | no |  |  |  |  |  |
|  | Bb | no |  |  |  | merge |  |
|  | Bc | no |  |  |  |  |  |
|  | Bd | yes | previous |  |  |  | Ad |

Fig. 18

| target list | | | |
|---|---|---|---|
| group Ca | 1 | group Bc | 34 |
|  | 2 |  | 36 |
|  | 3 |  | 37 |
|  | 5 |  | 38 |
| group Cb | 7 | | |
|  | 7 | | |
|  | 14 | | |
|  | 18 | | |
| group Cc | 19 | | |
|  | 22 | | |
|  | 27 | | |
|  | 27 | | |
| group Cd | 30 | | |
|  | 34 | | |
|  | 35 | | |
|  | 39 | | |
| group Ce | 39 | | |
|  | 40 | | |
|  | 40 | | |
|  | 41 | | |
| group Cf | 45 | | |
|  | 50 | | |
|  | 59 | | |
|  | 77 | | |
| group Cg | 76 | | |
|  | 80 | | |
|  | 82 | | |
|  | 94 | | |

Fig. 20

| list A | list B | interaction | shared previous | shared next | operation |
|---|---|---|---|---|---|
| group Ca | group Bc | no | | | |
| group Cb | group Bc | no | | | |
| group Cc | group Bc | no | | | |
| group Cd | group Bc | yes | no | no | merge |
| group Ce | group Bc | no | | | |
| group Cf | group Bc | no | | | |
| group Cg | group Bc | no | | | |

Fig. 21

| Final sorted list | |
|---|---|
| group Ca | 1 |
| | 2 |
| | 3 |
| | 5 |
| group Cb | 7 |
| | 7 |
| | 14 |
| | 18 |
| group Cc | 19 |
| | 22 |
| | 27 |
| | 27 |
| group Cd/Bc | 30 |
| | 34 |
| | 34 |
| | 35 |
| | 36 |
| | 37 |
| | 38 |
| | 39 |
| group Ce | 39 |
| | 40 |
| | 40 |
| | 41 |
| group Cf | 45 |
| | 50 |
| | 59 |
| | 77 |
| group Cg | 76 |
| | 80 |
| | 82 |
| | 94 |

Fig. 22

ALGORITHM TO APPLY A PREDICATE TO DATA SETS

This invention relates to a method of analysing a first digital data set and a second digital data set with respect to a predicate, the predicate having a predicate criterion, each data set comprising one or more elements. Such a method may be used in performing joining, sorting, searching or the like operations on pairs of digital data sets.

BACKGROUND

Databases are used for storage and retrieval of information. Users typically access the database information using database management software. The storage media and management software together comprise a database management system. The database management system may be implemented on a single centralised machine or using a distributed system where data storage and processing, and management software are located across multiple machines.

A significant portion of operations performed within the database management software can be attributed to satisfying a predicated function that consumes zero or more input variables, the input variables are data elements stored in the database.

For instance joining, sorting and searching are all examples of database management operations carried out on a data set or a pair of data sets where a predicate function is employed at the base case of a predicate. Typically, a join algorithm is aiming to match the elements of a first data set with elements of a second data set having an equal value, or other value that satisfies the join predicate. Join algorithms are of particular interest in database management systems where tables containing related information are joined to gain more useful information. In current approaches to carrying out these operations, all of the elements of both data sets involved in the operation have to be evaluated in some way with regards to their suitability in satisfying the predicate function.

This can be a wasteful exercise when the predicate function is positively satisfied in a minority of cases. For example, in a nested loop join, the first element in the first data set is compared against every element in the second data set, then the next element in the first data set is compared against every element in the second data set, and so on until every element in the first data set has been compared against every element of the second data set. This is a computationally expensive algorithm. Additionally, it does not perform well on large data sets. Using Big O notation, this algorithm has a complexity of O(n×m) where n and m are the number of elements in each list. From this one can determine as n and/or m get large, the number of operations required to perform the join become prohibitive. As an example, a join where n contains 6 elements and m contains 4 elements would require 24 operations. Joining two lists of 10 elements each would require 100 operations.

Another known join algorithm is the merge join where both data sets are initially sorted. The first element in the first data set is compared to the first element of the second data set. If the element from the second data set is less than or equal to the element from the first data set it is transferred to the final sorted list. The next element from the second data set is compared and so on until an element of the second data set that is larger than the first element of the first data set is identified. At that point, the element from the first data set is transferred to the final sorted list and the pointer begins moving through the elements of the first data set carrying out comparisons. The merge join is more efficient than the nested loop join, but is still somewhat inefficient. Using Big O notation, this algorithm has a complexity of O(n+m). The Big O notation for this algorithm indicates it will perform better than the nested loop join at scale. However, this algorithm is by its nature a blocking algorithm and would need to be processed in series. As such, it is not adaptable to a parallel implementation. This limits its usefulness when used at scale.

A further known join algorithm is the hash join, which is carried out in two phases. In the first phase, a hash table is built by applying a hash function to each element of the second data set. The output of the hash function is used as the location of an address space where that particular element is stored. In the second phase, the same hash function is applied to the elements of the first data set. This provides allocation into the hash table address space which can be addressed in real time. If an element of the second data set was stored at the location, the elements can be compared and the join evaluated. Hash join is very fast once the hash table has been built, however it is constrained by the size of the available memory. Additionally, it can only be used when the join employs an equality predicate, so lacks flexibility. The Big O notation for this algorithm is similar to that of merge join $O(n_{c+}m_h)$. It is however faster than merge join as each operation is quicker, particularly the lookup phase once the hash table has been created.

It is an object of certain aspects of the disclosure to overcome at least some of the above-mentioned issues.

BRIEF SUMMARY OF THE DISCLOSURE

According to one aspect, there is provided a method of analysing a first digital data set and a second digital data set with respect to a predicate, the predicate including a predicate criterion, each data set comprising one or more digital elements sorted according to the predicate criterion, wherein the method is adapted to operate on a processing device comprising a plurality of computing cores, and the steps of the method comprise:
 (a) partitioning each data set into a plurality of sub-groups, each sub-group having an upper boundary element and a lower boundary element;
 (b) for each sub-group of the first data set, evaluating the probability of the predicate being satisfied by at least one element of that sub-group and at least one element of each sub-group of the second data set by analysis of the boundary elements of the sub-groups, where each pair of sub-groups evaluated is referred to as a sub-group pairing;
 (c) classifying a sub-group pairing as a zero probability sub-group pairing if there is a zero probability of the predicate being satisfied by the elements of the sub-group pairing;
 (d) classifying a sub-group pairing as non-zero probability sub-group pairing if there is a non-zero probability of the predicate being satisfied by the elements of the sub-group pairing;
 (e) for each non-zero probability sub-group pairing recursively repeating steps (a) to (d) until the partitioning step results in base case sub-groups for both data sets, wherein the recursions are distributed among the plurality of cores;
 (f) performing a predicate evaluation of the elements within each base case sub-group pairing.

Optionally, there is provided a method comprising the additional step of generating an output digital data set comprising the base case sub-group pairings where the predicate evaluation is true.

Optionally, there is provided a method 2 in which steps (a) to (d) are carried out by a single core in a first instance.

Optionally, there is provided a method in which steps (a) to (d) are carried out by a single core in each recursion.

Optionally, there is provided a method in which a size of one of the first data digital set and second digital data set is in the order of billions of elements or above.

Optionally, there is provided a method in which a size of one of the first digital data set and second digital data set is in the order of multi-terabytes or above.

Optionally, there is provided a method carried out as a depth-first process.

Optionally, there is provided a method carried out as a breadth-first process.

Optionally, there is provided a method in which, for each level of recursion, the sub-groups of the first data set have a first sub-group number of elements; the sub-groups of the second data set have a second sub-group number of elements. The first sub-group number of elements may be equal to the second sub-group number of elements but this is not a requirement. Partition sizes may be optimised based on the hardware platform on which the method is implemented.

Optionally, each data set may be partitioned into data sets of equal sizes.

Optionally, there is provided a method in which the predicate is an equality.

Optionally, there is provided a method in which the base case is defined in relation to the hardware on which the method will be carried out, the nature of the predicate; and the nature of the data.

Optionally, there is provided a method in which the base case sub-groups comprise four elements.

Optionally, there is provided a method in which an element comprises a plurality of sub-elements in which there is one pertinent sub-element to which the predicate criterion relates and the remaining sub-elements are non-pertinent sub-elements. In this way, the method may be applied to data base tables comprising a number of fields, that is sub-elements, in each element. Optionally, there is provided a method comprising the initial step of storing the elements of at least one of the sorted digital data sets in consecutive memory address locations.

Optionally, there is provided a method in which in which the step of partitioning comprises identifying the memory location of the upper boundary element and the memory location of the lower boundary element of a sub-group and retrieving the elements stored therein.

Optionally, there is provided a method in which in which the processing device is a Graphics Processing Unit (GPU).

Optionally, there is provided a method implemented across a cluster of computing devices, each computing device comprising a plurality of computing cores.

According to a further aspect, there is provided an apparatus for analysing digital data sets with respect to a predicate, the predicate including a predicate criterion, the apparatus comprising memory adapted to store a first digital data set and a second digital data set, each data set comprising one or more digital elements sorted according to the predicate criterion; and at least one processing device having a plurality of computing cores; the apparatus being adapted to:

(a) partition each data set into a plurality of sub-groups, each sub-group having an upper boundary element and a lower boundary element;

(b) for each sub-group of the first data set, evaluate the probability of the predicate being satisfied by at least one element of that sub-group and at least one element of each sub-group of the second data set by analysis of the boundary elements of the sub-groups, where each pair of sub-groups evaluated is referred to as a sub-group pairing;

(c) classify a sub-group pairing as a zero probability sub-group pairing if there is a zero probability of the predicate being satisfied by the elements of the sub-group pairing;

(d) classify a sub-group pairing as non-zero probability sub-group paring if there is a non-zero probability of the predicate being satisfied by the elements of the sub-group pairing;

(e) for each non-zero probability sub-group pairing, recursively repeat steps (a) to (d) until the partitioning step results in base case sub-groups for both data sets, wherein the recursions are distributed among the plurality of cores;

(f) perform a predicate evaluation of the elements within each base case sub-group pairing.

According to an aspect, there is provided the use of a method disclosed herein to carry out a join operation.

According to an aspect, there is provided the use of a method disclosed herein to carry out a sort operation.

According to an aspect, there is provided the use of a method disclosed herein to carry out a search operation.

Optionally, there is provided an apparatus further adapted to generate an output digital data set comprising the base case sub-group pairings where the predicate evaluation is true.

Optionally, there is provided an apparatus in which a size of one of the first data digital set and second digital data set is in the order of billions of elements or above.

Optionally, there is provided an apparatus in which a size of one of the first digital data set and second digital data set is in the order of multi-terabytes or above.

Optionally, there is provided an apparatus in which the elements of at least one of the sorted digital data sets are stored in the memory in consecutive memory address locations.

Optionally, there is provided an apparatus in which the processing device is a Graphics Processing Unit (GPU).

Optionally, there is provided an apparatus in which the processing device comprises a Single Program Multiple Data (SPMD) parallel computing architecture.

Optionally, there is provided an apparatus comprising a cluster of apparatuses as described herein.

Optionally, there is provided a computer device as comprising a Single Program Multiple Data (SPMD) parallel computing architecture. Operation in a SPMD environment is facilitated by the non-blocking aspect of the method. Each two groups that are identified to interact can be further processed out of sync with any other group that is identified to interact. Also, any of the base cases can be processed out of sync. In fact, base cases can be processed while other parts of the algorithms are still identifying partitions that interact.

According to an aspect of the disclosure, there is provided a computer device programmed to carry out a method disclosed herein.

According to an aspect there is provided computer code which, when executed by a processing device comprising a plurality of computing cores, causes the processing device to perform the methods described herein.

BRIEF DESCRIPTION OF THE DRAWINGS

Embodiments of the invention are further described hereinafter with reference to the accompanying drawings, in which:

FIG. 9 comprises partitioned Customer Data Sales Data tables for use in an exemplary join operation;

FIG. 10 is a table identifying the interactions between the sub-groups of the table sin FIG. 9;

FIG. 11 comprises the further partitioned tables shown in FIG. 9;

FIG. 12 is a table listing all interacting sub-group pairings from FIG. 11;

FIG. 13 is a table showing the results of the base case evaluation of the join operation performed on the tables of FIG. 9;

FIG. 14 is table comprising a pair of sorted lists to be merged into a single sorted list;

FIG. 15 is a table showing the outcome of the evaluation of the interactions in the lists shown in FIG. 14;

FIG. 17 is table comprising a further pair of sorted lists to be merged into a single sorted list;

FIG. 18 is a table showing the outcome of the evaluation of the interactions in the lists shown in FIG. 17;

FIG. 20 is table showing the starting point of the second iteration of the method for the example of FIG. 17;

FIG. 21 is table showing the interactions found in the second iteration; and

FIG. 22 is the final sorted merged list for the example of FIG. 17.

DETAILED DESCRIPTION

Figure 1:
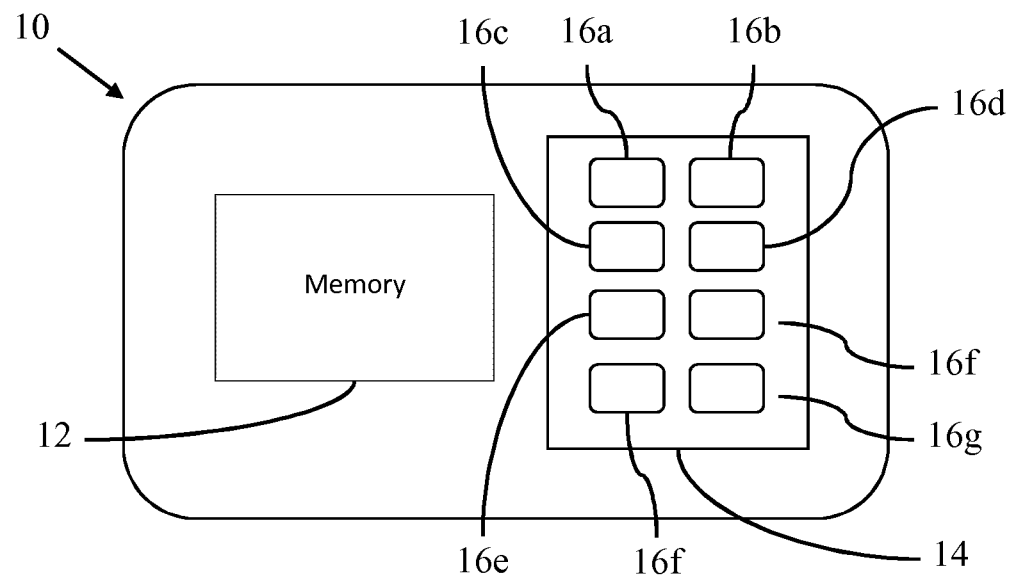
FIG. 1 is a block diagram of an apparatus according to the disclosure.

The term recursive maybe understood to refer to a process repeating in a self-similar way, having a defined base case or cases; and a set of rules that reduce all other cases towards the base case.

The term base case may be understood to refer to a case of a recursive definition that is not defined in terms of itself. The base case, also referred to as an atomic case or a halting case, is the scenario that can be solved without any recursive calls. The base case is what stops the recursion from continuing for ever.

The term probability may be understood to refer to a measure or estimation of how likely it is that something will happen or that a statement is true. Probabilities herein are given a value of zero (0% chance, will not happen) and non-zero (greater than 0% chance, may happen).

The term predicate may be understood to refer to a statement that may be true or false depending on the values of its variables. It can be thought of as an operator or function that returns a value that is either true or false. The operator or function may consume zero or more variables. For example, a predicate may be an equality predicate; 'greater than' predicate, 'less than' predicate, an expression such as x>a+b/c where x, a, b and c are all integers; or other suitable predicate.

According to one aspect of the disclosure, there is provided a method of analysing a first digital data set and a second digital data set with respect to a predicate, the predicate including a predicate criterion, each data set comprising one or more digital elements sorted according to the predicate criterion, wherein the method is adapted to operate on a processing device comprising a plurality of computing cores, and the steps of the method comprise:

(g) partitioning each data set into a plurality of sub-groups, each sub-group having an upper boundary element and a lower boundary element;

(h) for each sub-group of the first data set, evaluating the probability of the predicate being satisfied by at least one element of that sub-group and at least one element of each sub-group of the second data set by analysis of the boundary elements of the sub-groups, where each pair of sub-groups evaluated is referred to as a sub-group pairing;

(i) classifying a sub-group pairing as a zero probability sub-group pairing if there is a zero probability of the predicate being satisfied by the elements of the sub-group pairing;

(j) classifying a sub-group pairing as non-zero probability sub-group pairing if there is a non-zero probability of the predicate being satisfied by the elements of the sub-group pairing;

(k) for each non-zero probability sub-group pairing recursively repeating steps (a) to (d) until the partitioning step results in base case sub-groups for both data sets, wherein the recursions are distributed among the plurality of cores;

(l) performing a predicate evaluation of the elements within each base case sub-group pairing.

In this way, there is provided a method capable of identifying where resources should be focused to satisfy a base case predicate. Each data set is partitioned into smaller groups. Each of the smaller groups is then analysed with regards to it interacting with groups of the other data set, by looking at their respective boundary elements. Interaction refers to a non-zero probability of the predicate being satisfied by at least one element from within each of the groups. Two groups that are found to interact are passed to the recursive function and further analysed. Recursion allows for a finer analysis of those groups that do interact until the base case is reached. Recursion provides for the elimination of the largest non-interacting groups first, thus focusing the available resources on the data likely to be relevant.

The recursion operations may be distributed among the plurality of cores. In this way, the recursion operations may operate in parallel. The recursion operations are independent of each other, in that they can complete all their recursive paths and evaluate their base cases without requiring information from any other recursion operating on another core. All that a core requires is allocation of the relevant data sub-groups and the predicate. The recursion operations may operate simultaneously on the individual cores.

By eliminating non-interaction sub-groups, many elements will never need to be evaluated at base case level, contrary to the prior art approaches wherein the memory location of every element in the data sets has to be visited at some stage in the process. Additionally, the method is non-blocking in that the suspension of one or more calls to the recursive or base case processes will not stop the potential progress of the remaining processes. This non-blocking characteristic is particularly relevant when employing this algorithm in a parallel environment or in a distributed system.

Referring initially to FIG. 1, there is shown a block diagram of an apparatus indicated generally by the reference numeral 10. The apparatus 10 comprises a memory 12 and a processing device 14 having eight computing cores 16a, 16b, 16c, 16d, 16e, 16f, 16g, 16h. Each core may be an independent Central Processing Unit (CPU), capable of reading and executing program instructions. Such an apparatus represents a computer architecture suitable for parallel computing. For example, the apparatus may represent a Graphics Processing Units (GPUs). Similarly, the apparatus may represent a Single Program Multiple Data (SPMD) architecture. The plurality of cores may homogenous or heterogeneous within the processing device. The processing device may comprise a mechanism for identifying the utilisation of the plurality of cores.

Figure 5:
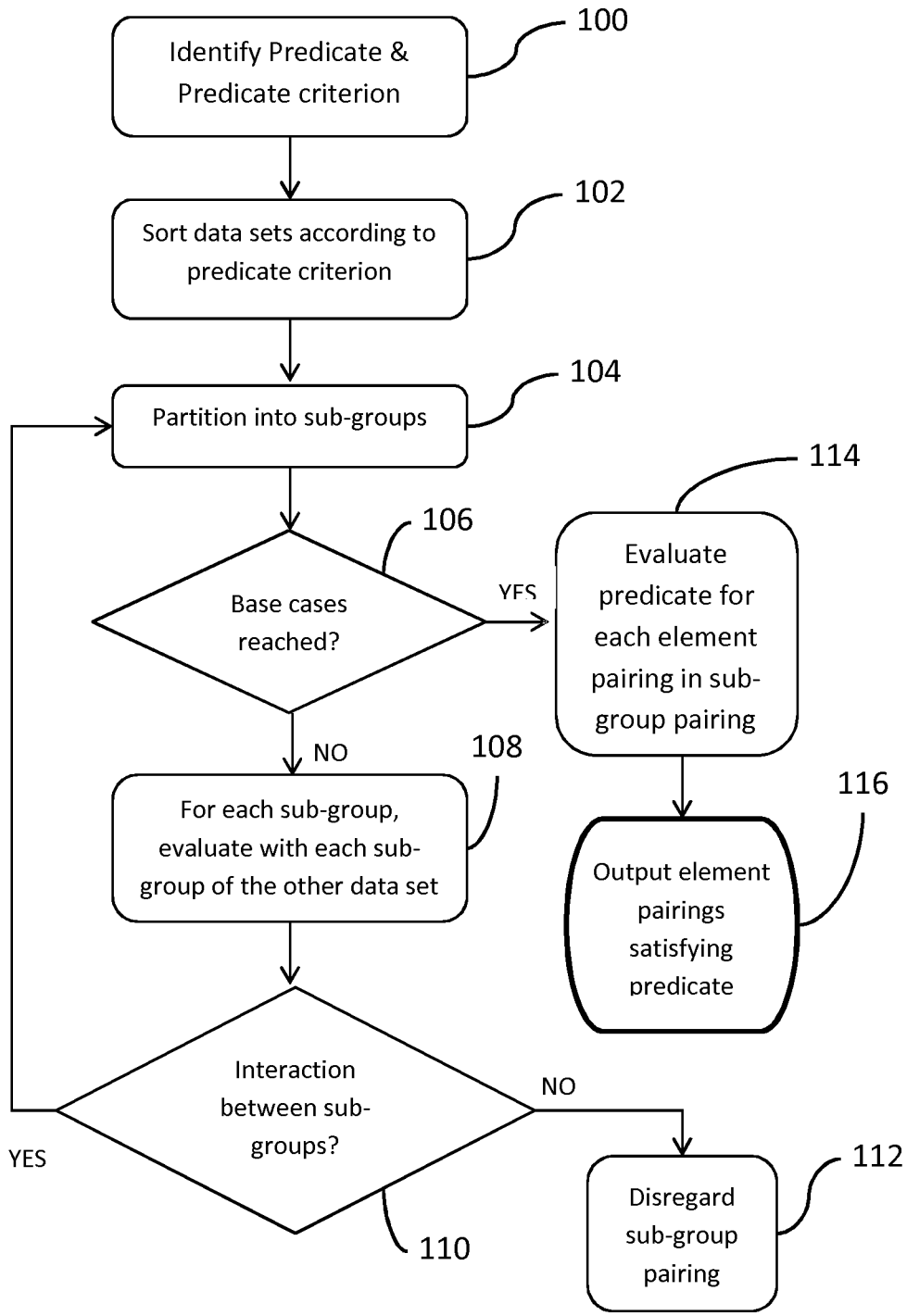
FIG. 5 is a flow chart of the operation of one aspect of the disclosure.

Referring now to FIG. 5, in step 100, the pair of data sets to be analysed, the predicate and the predicate criterion are identified. In step 102, the data sets are sorted according to the predicate criterion. In step 104, each data set is partitioned into sub-groups. Ideally the sub-groups within each data set are equal in size, as processing may be optimised in this manner. However, for a data set having a number of elements that does not divide equally by the preferred partitioning, the last sub-group will be formed with a different number of elements. For a list of m elements and a preferred partition of n, ideally there are m/n subgroups. However, if m is not divisible by n, there will be ((m/n)−1) subgroups of equal numbers of elements, and one subgroup of the remaining elements.

The partitioning may be considered a virtual partitioning as it is not necessary to physically partition the data sets in any way. Partitioning may simply comprise reading from memory the elements identified as the boundary elements for a particular partition. Typically, each data set is stored in consecutive address locations in memory. For example, this may be implemented using an array structure, whereby an element in the array is accessed using its array index. In this way, partitioning the data set may comprise identifying the array indexes that correspond to the boundary elements for the size of the desired partitions. In an example data set comprising thirty-two elements to be partitioned into four partitions of eight elements, the boundary elements for the first partition can be accessed by reading the first and eighth memory locations; the boundary elements for the second partition can be accessed by reading the ninth and seventeenth memory locations and so on. It is not necessary for the elements of a data set to be stored in consecutive address locations. For example, the elements may be stored randomly, with knowledge of the memory addresses according to the sorted data set. As such, the partitioning step may comprise firstly identifying the size of the partitions to be used and then retrieving the corresponding boundary elements from memory.

In step 106, a check is carried out to see if the partitioning has led to a base case sub-group being reached. The method will also comprise a base case sub-group check before the first partitioning to ensure that both data sets need to be partitioned. The base case sub-group is defined with reference to the hardware on which the method is operating; the nature of the predicate, that is whether it is an equality, greater than, less than or other predicate; and the nature of the data, that is whether is it text data, numerical data or the like. In this way, the base case sub-group may vary from one implementation of the method to another. For example, if the data sets being analysed were known to have a sparse interaction, it may be more efficient to implement a larger base case. Also, if the predicate were computationally complex for each comparison, e.g. $x<a+b/c$), or if the predicate consumes several lists of elements, it may be useful to implement a smaller base case.

In step 108, each sub-group of the first data set is evaluated for interaction against each sub-group of the second data set, by reference to the upper boundary element and lower boundary element of each. Each evaluation comprises a pair of sub-groups, one from the first data set and the other from the second data set, as such these sub-groups may be referred to as a sub-group pairing.

In step 110, the probability of the predicate being fulfilled by the elements of the sub-group pairings is evaluated. If there is zero probability of satisfying the predicate, in step 112, there is deemed to be no interaction and that sub-group pairing is disregarded. No further processing or analysis is required in relation to that pairing. Typically, steps 108 and 110 are carried out by a single core, but may be handled by different cores. It is more efficient to use a single core, however.

However, if there is a non-zero probability of predicate satisfaction, that sub-group pairing is deemed to have interaction and is sent for further analysis through recursive partitioning. The recursive partitioning steps may be distributed to different cores within the processing device. Typically, the recursive operations are distributed to available cores according to occupancy.

When, on a trip through the recursive steps of partitioning 104, base case check 106, evaluation 108 and interaction check 110, it is identified that base-case sub-groups have been reached on both sides, the elements of those sub-group pairings with a non-zero probability of predicate satisfaction are evaluated with respect to the predicate in step 114. The results of this evaluation are output to an output data set as the results of the method in step 116. There is a single output data set to which all cores output their results.

In certain cases where the data sets are of different sizes, sub groups of base case size for one data set will be reached while the other data set is still in need of further partitioning. In this instance, recursion continues, however the smaller group is not re-partitioned and remains at base case size until the larger data set also reaches base case size. Only when both sub-partitions reach base case size does recursion stop and the base case is employed.

Figure 2:
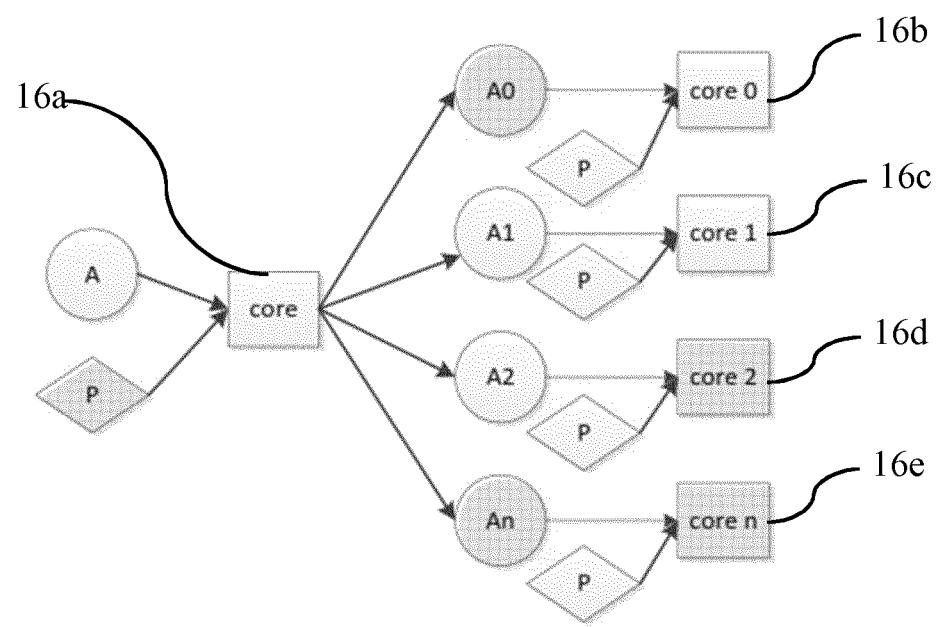
FIG. 2 is a process diagram of a recursive evaluation according to the disclosure.

Referring now to FIG. 2, there is illustrated a process of evaluating some data A, with respect to a predicate P. Initially, the data A comprising a pair of data sets, are allocated to a first core 16a with available occupancy. The first core 16a carries out the first partition and evaluation steps and identifies n interacting sub-groups for further analysis. These sub-groups A0, A1, A2, to An may then be distributed to other available cores for further partitioning and evaluation. The first core 16a may carry out the further partitioning and evaluation on one or more sub-groups itself. Distribution of a partitioning and evaluation operation to a core simply involves passing the subset of the data A and the predicate to the new core. Passing the sub-set may comprise passing the address in memory of the boundary elements for the sub-groups in the sub-set. While n sub-groups and n cores are illustrated, it is not necessary to have a core for each identified interacting sub-group.

Figure 3:
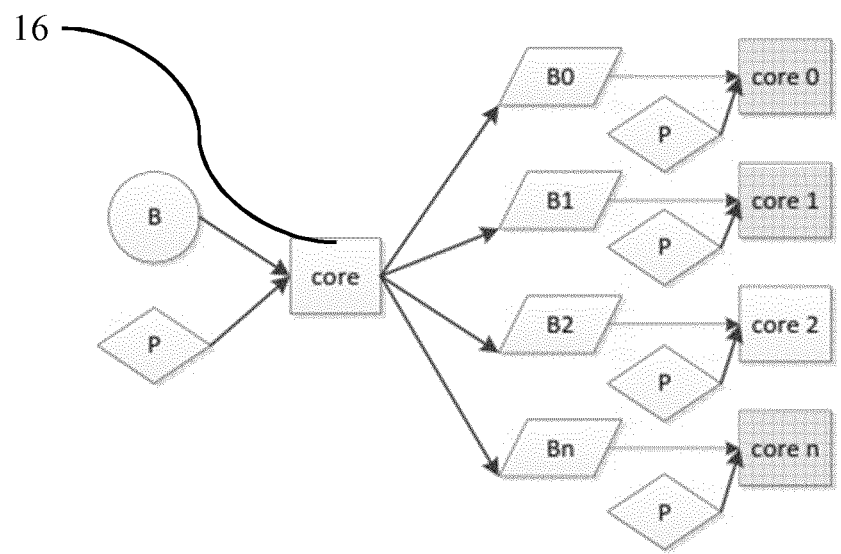
FIG. 3 is a process diagram of a final recursive evaluation according to the disclosure.

Referring to FIG. 3, there is illustrated a process of the final evaluation with respect to predicate P. The core 16, which may represent any of the cores 16a to 16n shown in FIG. 2, receives data subset B for evaluation, and generates zero to n base cases comprising data subsets B0 to Bn. The base case subsets may be distributed to other cores as per the partition and evaluation operations.

Figure 4:
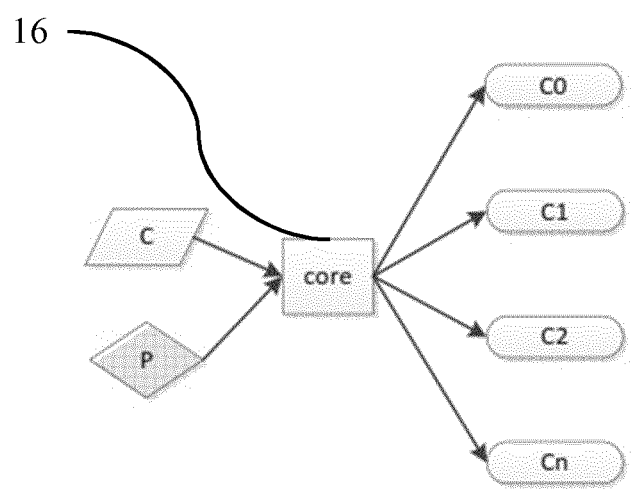
FIG. 4 is a process diagram of a base case evaluation according to the disclosure.

Referring to FIG. 4, a base case evaluation is illustrated at a core 16. The core 20 receives base case data C and predicate P, and generates between 0 and n end results C0 to Cn, where the end results are subsets of the data subset C. In each of the processes illustrated in FIGS. 2 to 4, a core may only receive the relevant data sub-group or an indication thereof and the predicate to be evaluated. The cores may carry out their evaluations independently of and in parallel to evaluations being carried out by other cores. If a core's output requires further evaluation, it may recursively process the outputs itself, or pass the output to another core for recursive processing.

Figure 6:
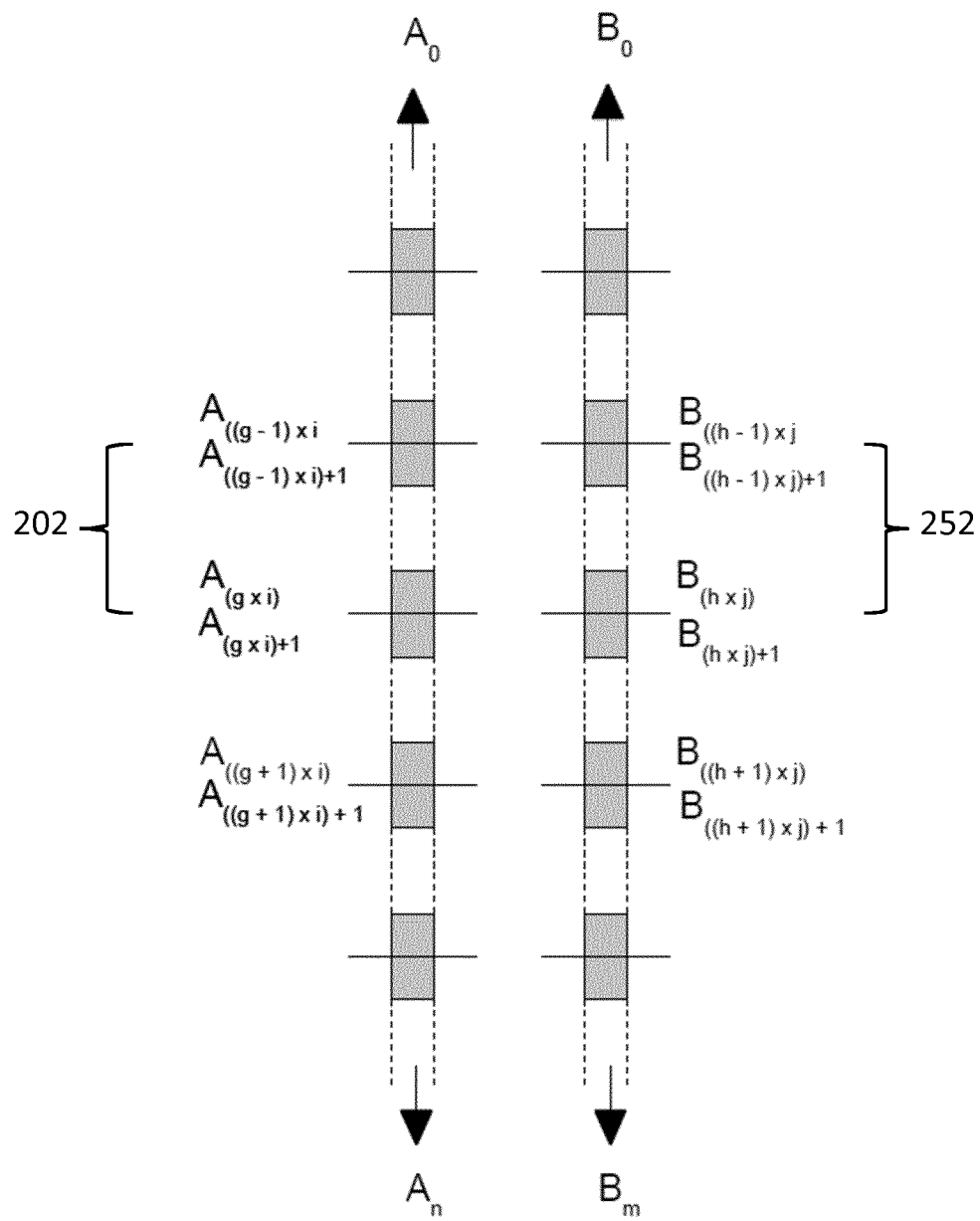
FIG. 6 is a is an illustration of a pair of data sets portioned into a first set of sub-groups according to one aspect of the disclosure.
Figure 7:
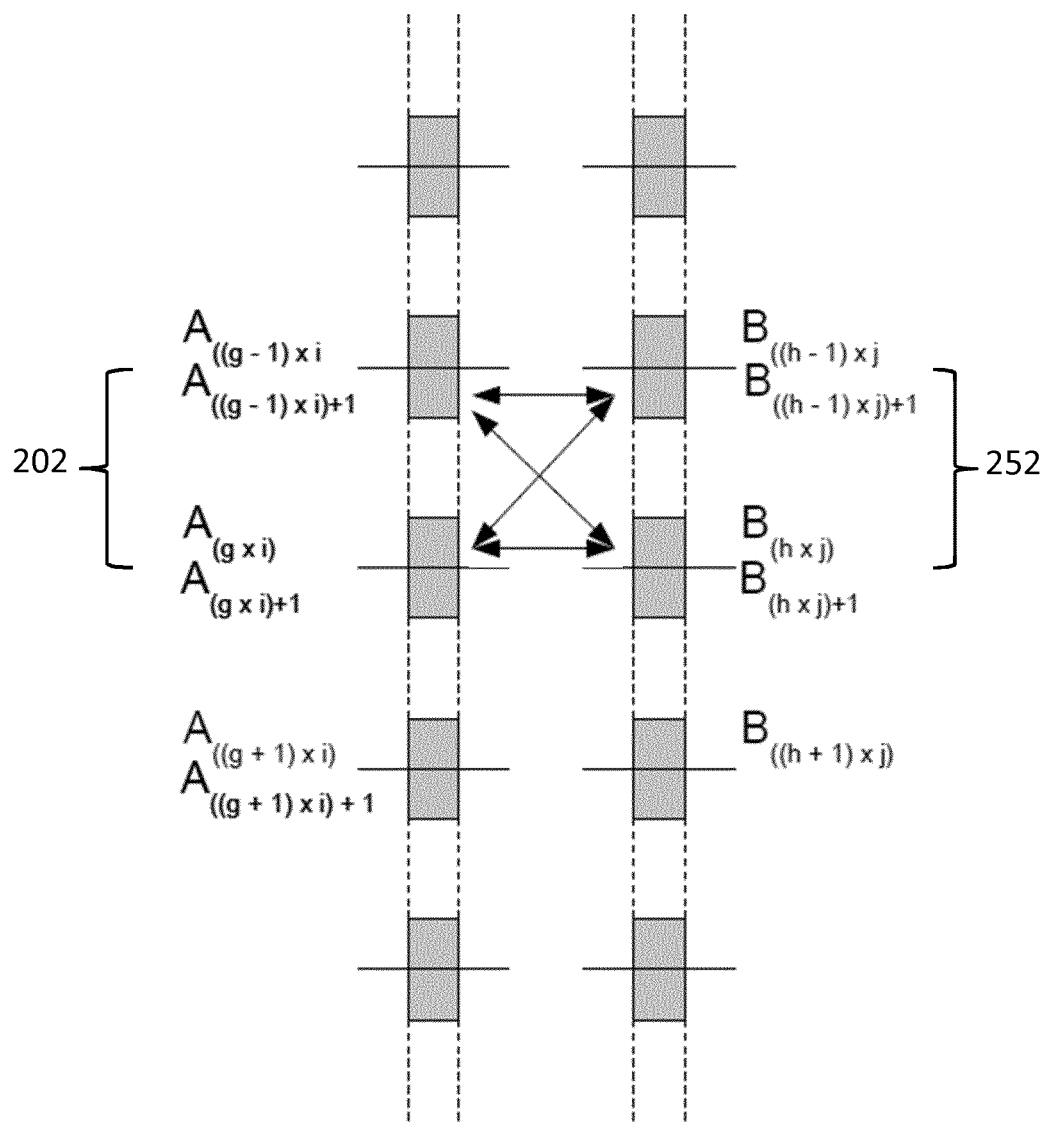
FIG. 7 is a is an illustration of the data sets shown in FIG. 2 undergoing the evaluation step of an aspect of the disclosure.
Figure 8:
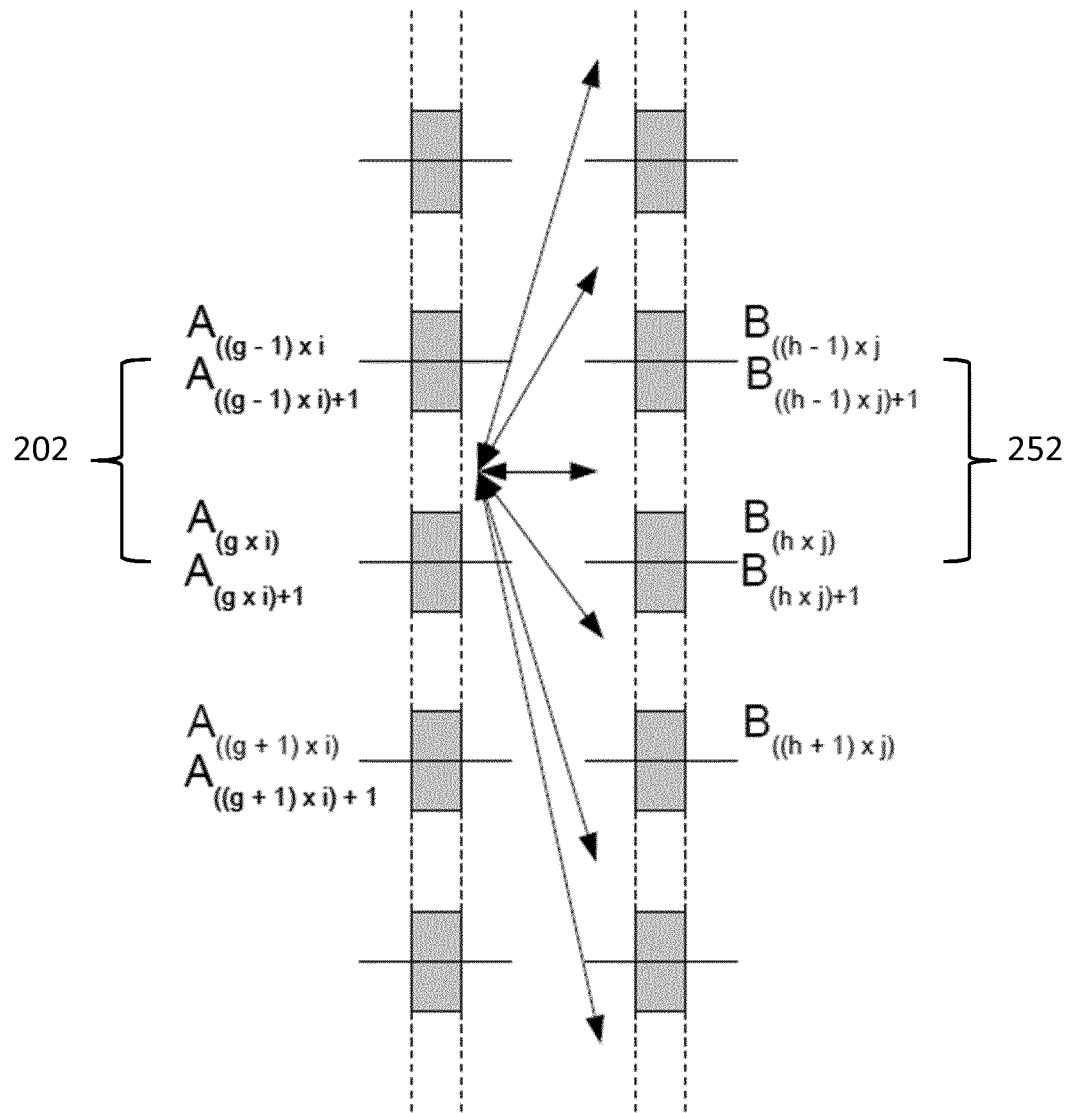
FIG. 8 is a is an illustration of the data sets shown in FIGS. 2 and 3 illustrating a repetitive aspect of one an aspect of the disclosure.

Referring now to FIGS. 6 to 8, each of the steps will be explained in more detail. In FIG. 6, there is shown a pair of data sets A 200 and B 250. Data set A 200 has n elements, while data set B 250 has m elements. The data sets are to be processed according to the methods disclosed herein, where they will be analysed according to a predicate having a predicate criterion. For this example, the predicate is an equality predicate. Both data sets 200, 250 are sorted according to the predicate criterion, and are stored in suitable memory. Data set A 200 has been partitioned into r number of sub-groups of equal length i such that $$(r-1) \times i < n \leq r \times i$$

Data set B 250 has partitioned into p number of sub-groups of equal length j such that $$(p-1) \times j < m \leq p \times j$$

In FIG. 6, sub-group $A_g$ 202 and sub-group $B_h$ 252 have been identified such that $0 < g \leq r$ and $0 < h \leq p$, where r, p, i, j, g, h are positive non-zero integers. Sub-group $A_g$ 202 of the first data set comprises the elements of A between $((g-1) \times i)+1$ and $(g \times i)$. Similarly, sub-group $B_h$ 252 comprises the elements of B between $((h-1) \times j)+1$ and $(h \times j)$.

Each shaded square in FIG. 6 indicates a boundary element of a sub-group of data set A 200 and of data set B 200, with the dashed lines between boundary elements indicating the i−2 number of intervening elements.

Referring now to FIG. 7, the sub-groups of the data sets A 200 and B 250 are evaluated against each other to identify interactions. Each sub-group of data set A 200 is evaluated against each sub-group of data-set B 200, thereby forming, at least temporarily, a plurality of sub-group pairings. Any sub-group pairing is deemed to have interaction if the probability P of the predicate being fulfilled by elements from within the data set A sub-group in combination with elements from the data set B sub-group is non-zero. This probability can be determined by looking at the upper boundary elements and lower boundary elements from each sub-group according to the predicate to be satisfied. The upper boundary element and lower boundary element of the data set A sub-group are compared with the upper boundary element and lower boundary elements of the data set B sub-group. If there is overlap between the range defined between the boundary elements of the data set A sub-group and the range defined between the boundary elements of the data set B sub-group then there is an interaction between the subgroups, as the probability of the sub-groups satisfying the predicate is non-zero. If there is no overlap between the ranges, then there is no interaction, as the probability of fulfilling the predicate with elements of the two sub-groups is zero. An overlap may exist if one sub-group has a partial overlap with another sub-group at one end thereof; or also may occur if one sub-group is fully contained within the other sub-group. FIG. 7 shows one evaluation where the boundary elements of sub-group $A_{sub-group-g}$ 202 are being compared with the boundary elements of sub-group $B_{sub-group-h}$ 252.

As an example of determining interaction between two sub-groups according to an equality predicate, consider sub-groups X and Y, where a is the lower boundary element sub-partition X, b is the upper boundary element of sub-group X, c is the lower boundary element of sub-group Y, and b is the upper boundary element of sub-group Y. Firstly, a check for duplicates is carried out by ensuring that a and b are not equal and that c and d are not equal. Then, the following four expressions are evaluated to determine interaction by overlap:

$$((a<=c) \text{ and } (c<=b)) \qquad (i)$$

$$((a<=d) \text{ and } (d<=b)) \qquad (ii)$$

$$((c<=a) \text{ and } (a<=d)) \qquad (iii)$$

$$((c<=b) \text{ and } (b<=d)) \qquad (iv)$$

If any of the four expressions (i) to (iv) are true, then there is overlap and the two sub-groups X and Y interact.

Referring now to FIG. 4, there is illustrated the evaluation of $A_{sub-group\ g}$ 202 against all the sub-groups of data set B. This step is then repeated for the other sub-groups of data set A.

Once the evaluations have been carried out for all sub-group pairings, the recursive phase of the method begins. Any sub-group pairing that is found to interact is then fed into the algorithm again, to be divided into further sub-groups as before. The next level of sub-groups are examined as before, with each further sub-group of the pairing from the first data set being examined against each further sub-group of the pairing from the second data set.

The recursion may be carried out as a depth first process, where an interacting sub pairing would be recursively analysed until the base case sub-groups could be evaluated. Alternatively, the recursion may be carried out on a breadth first basis, where all the interaction sub-group pairings for the first level of sub-division are identified before the next level of sub-division occurs. Optionally, the method may be implemented as a combination of depth-first and breadth-first processes.

These steps continue such that sub-partitions that interact are recursively re-partitioned and these smaller partitions investigated for interaction. The comparison of sub-partitions within two groups remains within the boundary of the parent partition groups.

In certain cases, all the elements in a sub-group are equal. In this case, this sub-group is flagged for further processing but no further sub-division is carried out as further sub-partitioning would provide no benefit.

The recursive aspect of the method allows the largest groups that don't interact to be identified early and excluded from further processing. In this way, significant numbers of elements will never need to be evaluated in the base case, thus providing for much more efficient use of the processing resources. Similarly, many individual elements are not evaluated at all, unlike the prior art where all elements must be evaluated in some way.

Recursion continues until the base case sub-groups are reached. The base case stops recursion and reverts to performing the original evaluation for each element of the base sub-group from the first data set with each element of the sub-group of the second data set. The base case evaluation also uses the predicate used to determine interaction in recursion, as both correspond to the aim of executing the algorithm.

The base case is reached when the size of the sub-partitions are significantly small enough. Small enough is a factor of the original group sizes, the complexity of the predicate, size of each data element and the characteristics of the machine being employed to perform the algorithm. The absolute size of the base case can be empirically determined and is a function of machine performing the processing, the data and data type and the predicate function.

While the utility of the method disclosed herein is evident with respect to any hardware architecture having the ability to store the data objects in some way, identify and retrieve the boundary elements and perform an evaluation of these boundary elements, aspects of the methods and apparatuses disclosed herein are particularly suited for implementation on a parallel computer architecture, such as a processing device having multiple cores and those provided in Graphics Processing Units (GPUs). Similarly, the method is very well suited to the Single Program Multiple Data (SPMD) paradigm, and such processes are well suited to being parallelised and to massively parallel hardware accelerators. The non-blocking aspect of the method facilitates use in these environments.

Additionally, implementations of the methods disclosed herein are particularly useful in dealing with so-called "Big Data" data sets i.e. data sets that are so large that they cannot be handled by traditional database systems. At the time of filing of the present application, "Big Data" refers to collections of data in the multi-terabyte, petabyte or exabyte order of magnitude. Similarly, "Big Data" may be understood to refer to collections of data having billions of elements, typically tens of billions of elements or greater.

In choosing a base case sizing, the structure of the hardware implementing the method must be considered. For example, for an implementation running on a Graphic Processor Unit (GPU) adapted to process instructions in warps with 32 threads per warp, a base case sizing of four elements is ideal. Each of the threads in a warp processes one of the predicate comparisons. If the number of comparisons does not match the warp size, redundant threads are launched resulting in inefficient utilisation. For a base case sub-group pairing of four elements each, there are sixteen predicate comparisons to be carried out. Therefore two base case sub-group pairings can be calculated in a single warp.

Conversely, if a base case of six elements were used, this would result in thirty six (six times six) predicate comparisons to be carried out. This would require two warps to be launched. The first warp would process thirty two comparisons and the second warp would process only 4 comparisons, leaving twenty eight threads of the second warp unused.

It would also be possible to have asymmetric sub-groupings in the base case. For example, one sub-group would contain four elements and the second sub-group would contain eight elements. This results in thirty two comparisons, fitting into a warp exactly, and providing good utilisation. However, this is not the most efficient as only twelve (eight plus four) elements are being compared, whereas when using a base case of four and four, two bases cases fit into a single warp and can compare sixteen (2×(4+4)) elements in thirty two comparisons on a single warp.

Thus in considering the base case sizing, it is important to work with the limitations of the chosen hardware platform so as to try to balance maximum occupancy with limited memory resources. For a standard CPU, there are no parallel processing issues to be taken into account, so it is simpler to derive the optimal base case size. Additionally, this may allow for a smaller base case size. For a parallel processing environment such as a Graphics Processing Unit (GPU), the chosen base case sizing should preferably provide enough work to each thread that it does not stall between memory reads. As such the preferred base case sizing should to be determined by an optimisation exercise, bearing in mind that the number of calculations is based on an exponential the base case size. If the base case size is too small, there will be many calculations in getting to the base case. However, if the base case size is too big, there will be too many calculations to perform at the base case evaluation. The person skilled in the art will recognise that the method will work with any base case size.

Number of sub-groups. It is important to note that the number of sub-groups per iteration is not related to the base case size. Additionally, the number of sub-groups within an iteration need not be the same for each iteration.

Referring now to FIG. 9, there is shown a pair on data sets on which a join operation is to be carried out by way of an implementation of the method disclosed herein. The data sets are 'Customer Data', comprising three columns—'customer ID', 'name' and 'loyalty': and 'Sales Data' relating to sale of a new product, having two columns—'customer ID' and 'quantity'. Each row represents an element, and the entries in the row are sub-elements. The 'Customer Data' data set comprises 62 customers, while the 'Sales Data' data set comprises records of 31 transactions. The question this example is looking to answer is: is this product attractive to my loyal customers?"

The Sales Data table tells us the customer ID of everyone who bought the new product. The Customer Data table tells us the name and customer loyalty ('loyal', 'core' or 'premium') associated with each customer ID. As such, the customer ID is the pertinent sub-element in the elements of both data sets. By joining these two lists of information using the 'customer id' field from each data set, we are able to highlight the customer details of the customers who purchased the new product and so find the answer to the question posed.

As we are looking to match customer IDs from one data set to customer IDs in another data set, the predicate is therefore an equality predicate, with customer id as a predicate criterion. Customer ID is an integer value and the data sets have been sorted according to the numerical value thereof.

In line with previous examples, a base case size of four elements has been chosen. Similarly, the number of partitions has been chosen to be four. However, the base case size is not related to the number of partitions or partition size.

FIG. 9 shows the data sets after the first partitioning. Partition sizes are determined by finding the first power of the number of partitions that is greater than the number of elements in the data set. Therefore for the 'Customer Data' data set having 62 elements, $4^3$, that is 64, is the relevant number, as $4^2$ that is 16 is smaller than 62. This number should then be divided by the number of partitions to find the desired partition size. As such 64 divided by 4 is 16, and there should be 16 elements in each partition in the first sub-division of the 'Customer Data' data set. Therefore the 'Customer Data' is divided into three sub-groups of 16 elements and one of 14 elements. The 'Customer Data' sub-groups are referred to as Aa, Ab, Ac and Ad.

For the 'Sales Data' data set, there are 31 elements, as so again 64 is the correct power, and therefore there should be 16 elements per sub-group. As such, 'Sales Data' is partitioned into one sub-group of 16 elements and one of 15 elements. The 'Sales Data' sub-groups are referred to as Ba and Bb. The boundary element of each of the sub-groups is highlighted.

After the first sub-division of the data sets, the first interaction analysis is carried out, checking the probability of the predicate being satisfied by at least one element of each 'Customer Data' sub-groups and at least one element of the 'Sales Data' sub-groups, by analysis of the boundary elements of the sub-groups. Referring now to FIG. 6, we can see the results of the interaction analysis, in that the following sub-group pairing have been identified as interacting: Aa-Ba, Ab-Ba, Ab-Bb, Ac-Bb and Ad-Bb. Those sub-group pairings must therefore be analysed further.

We therefore progress through a recursion step of the method, carrying out a further partitioning step, resulting in the tables shows in FIG. 7. The output of the previous iteration is passed as the input to the algorithm in the next iteration. Each pair of interacting partitions is further partitioned according to the partitioning method described earlier in the example. Each group of 16 elements is divided into four sub-groups of four elements each, named Aa1, Aa2, Aa3 and Aa4, and so on through all the groups. Group Ad only had 14 elements so it is divided into three sub-groups of 4 elements and one sub-group of two elements. Group Bb has 15 elements so it is divided into three sub-groups of 4 elements each and one sub-group of 3 elements.

Again we evaluate the interaction between sub-group pairings by looking at their boundary elements. Taking for example, the sub-group pairings of group Aa and Ba, starting with group Aa1 and group Ba1. The boundary elements of group Aa1 are 20 and 43, while the boundary elements of group Ba1 are 4 and 20. There is overlap here so this is an interacting sub-group pairing and must be analysed further. However, if we look at group Aa2, whose boundary elements are 45 and 72, compared to group Ba1, whose boundary elements are 4 and 20, we see that there is no overlap and therefore there is no interaction and no further analysis of that sub-group pairing is required.

By continuing the analysis in that manner for all possible sub-group pairings, we arrive at the table shown in FIG. 12 which lists all interacting sub-group pairings. Of the 128 possible sub-group pairings, 16 interacting sub-group pairings have been identified for further analysis, representing an elimination of roughly 87.5% of the data to be analysed.

Before we consider any further sub-division of the groups we must check if we have reached the base case. As we have defined the base case size as four elements, we have reached the base case and we must now evaluate the sub-group pairings identified for further analysis. As such, every element in the interacting sub-groups must be compared with every element of the other sub-group of the sub-group pairing, looking for matching values in the customer id field.

The results of the base case evaluation are shown in FIG. 13 where there is shown a table of customer IDs, that customer's loyalty and the number of sales. From this, we can see that only two 'loyal' customers purchased the new product, so it does not appear to be greatly attractive to them.

Implementations of the method disclosed herein may be used in a variety of ways. The examples above relate to the use of the methods as part of a join operation. A search operation corresponds to a special case of a join operation, where one data set comprises a single element, which is the search term. A search operation may also be referred to as a filter or scan operation.

Additionally, the method disclosed herein may be used as part of a merge sort operation, particularly on a big data set. Merge sort comprises dividing a data set to be sorted into a number of smaller data sets, sorting the smaller data sets, and then merging the sorted data set back together such that the final data set is sorted. It is in this step of merging the sorted sub-groups back together that implementations of the method disclosed herein are used. Base cases are identified that relate to where an element is likely to be located in the final sorted list. The base cases are then combined, sorted (according to any suitable sort algorithm), and inserted into the correct position in the larger sorted list. The base case output would always be the two lists combined.

This merging operation is non-blocking such that all the interacting base case sub-groups can be evaluated at the same time and put together end to end or into their correct position in the final sorted list. Prior art merging operations are blocking in nature.

The difference between using the method described herein in relation to a join scenario and using it in relation to a sort operation is realised in the execution of the base case. In both join and sort operations, the method described herein is used to identify sub-groups of each parent data set that interact with sub-groups of the other parent data set. For a join operation, the base case is executed such that the join predicate is realised for the elements of two sub-partitions that make up any one specific base case pair.

However, for a sort operation, the base case is executed such that the elements in any one specific base case pair are combined, sorted and inserted at the appropriate position in the target sorted list.

Referring now to FIGS. 10, 11 and 12 there is illustrated an exemplary use on an implementation of the method in a sort operation. FIG. 14 shows a pair of sorted lists, List A and List B that are to be merged together to form a single sorted list. Each list comprises 16 elements. Each list has been partitioned into four sub-groups of four elements each. A base case sizing of four has been chosen. The sub-groups of List A are Aa, Ab, Ac, and Ad. The sub-groups of List B are Ba, Bb, Bc and Bd. An interaction analysis of each sub-groups pairing is carried out and the results are shown in FIG. 15. There is interaction in six sub-group pairings namely Aa/Ba, Ab/Ba, Ab/Bb, Ac/Bb, Ac/Bc, and Ad/Bd. As the current sub-group size of four elements matches the base case size, no further partition is required and it is necessary to evaluate the base case.

However, additional analysis needs to be performed before the sort base case pairs are to be merged. For instances where base case pairs share any one particular base case sub-group, it is necessary to choose which base case pairs should be processed first. One interacting sub-group pairing from each sub-group of list A is chosen for merging, this ensures that all of the elements of list A are included in the merged list. Those base case sub-group pairings where one of the sub-groups of the pairing is also in another interacting base case sub-group pairing are not merged initially into the merged sorted list. As such, base case sub-group pairings Aa/Ba, Ab/Bb, Ac/Bc, and Ad/Bd will be merged. But sub-group pairings Ab/Ba and Ac-Bb will not, as Ab/Ba shares sub-group Ba with sub-group pairing Aa/Ba and Ac-Bb shares sub-group Bb with Ab/Bb, as such their elements have already been included in the merged list.

Figure 16:
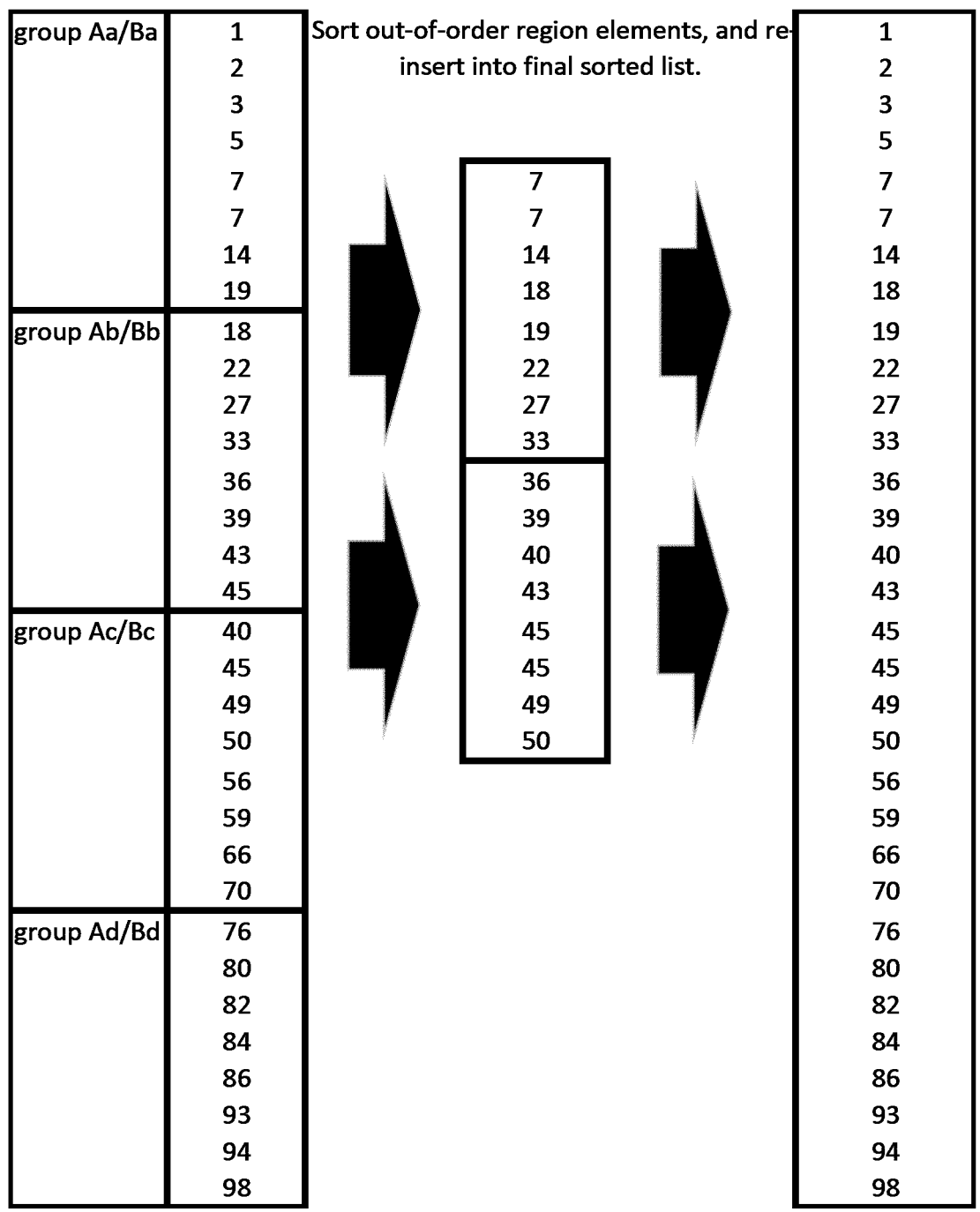
FIG. 16 shows the intermediate sorted list and final merged sorted list for the example of FIG. 14.

The results of the merging and sorting are shown in the left hand side of FIG. 16. Group Aa-Ba represents the sorted combination of sub-groups Aa and Ba. Group Ab/Bb represents the sorted combination of groups Ab and Bb. At the boundary of these two groups, "19" and "18" are out of order. This is considered a boundary because group Aa is next to group Ab in list A. It is also considered a boundary because group Ba is next to group Bb in list B. It is possible for out-of-order elements to occur at or near the boundaries between groups. Out-of-order elements may arise in an out-of-order region which covers a distance of group_size/2 either side of the boundary. In this instance the size of the group is 8, such that 8/2=4, therefore out-of-order elements may occur in the last four elements of group Aa/Ba and the first four elements of group Ab/Bb. To eliminate any out-of-order elements at the boundary, the elements in the out-of-order region are sorted. The results of this sorting operation are shown in the middle column on FIG. 16, where it can be seen that '18' and '19' were out of order at the border of group Aa/Ba and group Ab/Bb. Similarly, there were out of order elements at the border of group Ab/Bb and group Ac/Bc. Then this sorted data is inserted in the final sorted list, instead of the original data in the out-of-order region.

FIGS. 13 to 18 illustrate a further example of a sort operation using an implementation of the method. FIG. 17 shows a pair of sorted lists, List A and List B that are to be merged together to form a single sorted list. Each list comprises 16 elements. Each list has been partitioned into four sub-groups of four elements each. A base case sizing of four has been chosen. The sub-groups of List A are Aa, Ab, Ac, and Ad. The sub-groups of List B are Ba, Bb, Bc and Bd. An interaction analysis of each sub-groups pairing is carried out and the results are shown in FIG. 18.

FIG. 18 shows that seven interacting sub-group pairings were identified. The interacting sub-group pairings are analysed to identify if any sub-group pairing shares a sub-group with another interacting sub-group pairing, and those that do share are classified as to whether they share the previous group or with the next group. Only one interacting sub-group pairing from each sub-group of list A is chosen for merging. Interacting sub-group pairings that do not share a sub-group with a previous group (category 1 interacting sub-group pairings) are selected for merging, as are interacting sub-group pairings that share with a previous group but are not category 1 interacting sub-group pairings (category 2 interacting sub-group pairings).

Figure 19:
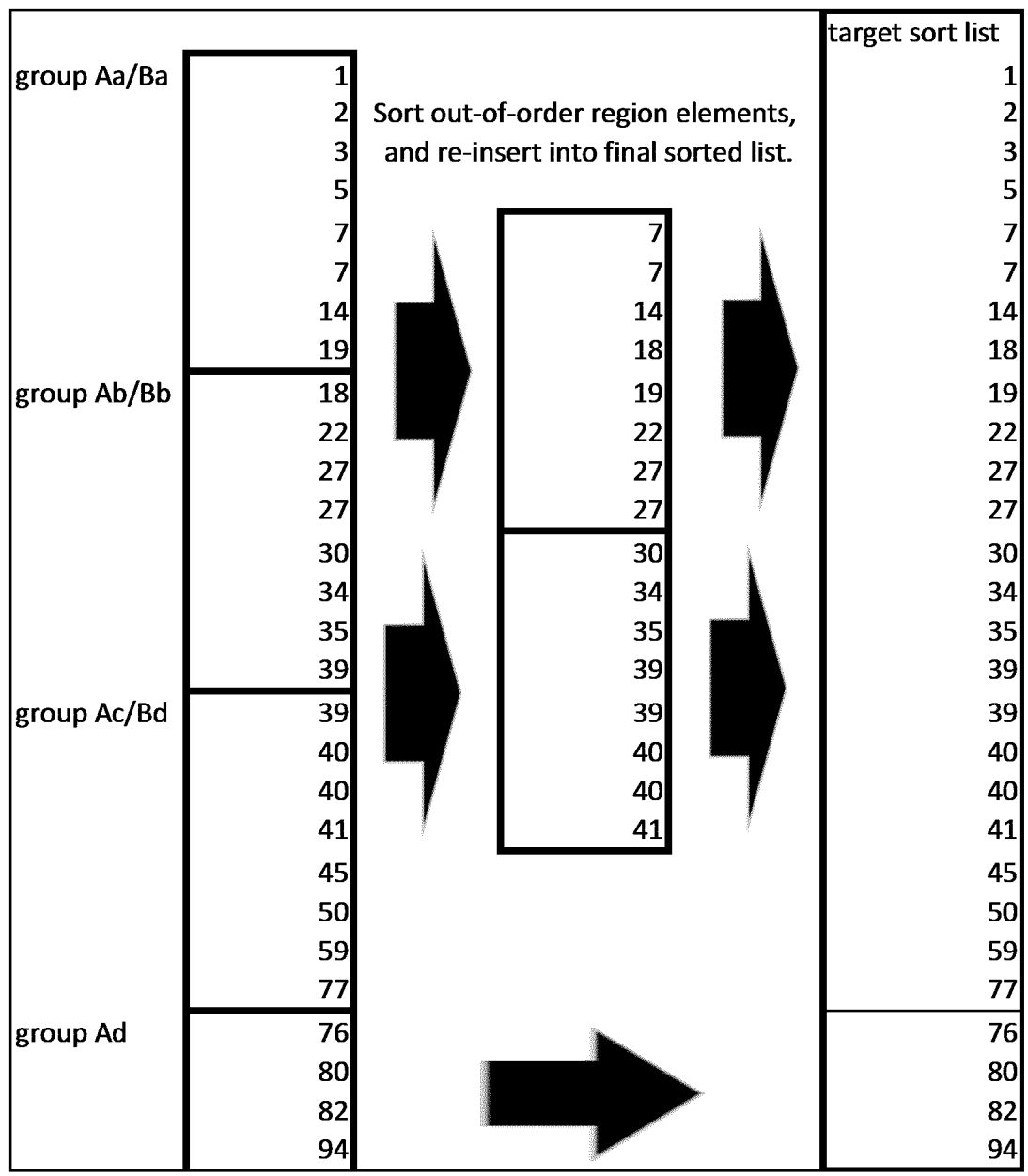
FIG. 19 shows the intermediate sorted list and merged sorted list at the end of the first iteration for the example of FIG. 17.

Referring now to FIG. 19, the intermediate results are shown on the left hand side. The out-of-order border region elements are sorted, resulting in the target sort list on the right hand side. Sub-group Ad is excluded from the merge operation and was inserted into the target sort list at the appropriate location. Sub-group Bc was excluded for merging on this iteration and is not shown in the target sort list.

Referring to FIG. 20 there is shown the starting point for the second iteration, which is subgroup Bc and the target sort list from the end of the first iteration, sub-divided into seven sub-groups of four elements each, identified as Ca, Cb up to Cg. Interactions between sub-group Bc and the sub-groups Ca to Cg of the target sort list are evaluated. One interaction is found, as shown in FIG. 21, between sub-groups Cd and Bc. These groups are both at base case size so it is necessary to evaluate the base case, as such Bc is merged into the sub-group Cd. There is no need to sort out-of-order border region elements in this instance as there is no sharing of base cases. FIG. 22 shows the final sorted list for this example.

This merging implementation of the method may also be used in the maintenance of a sorted list, for example adding new elements to the list at the correct location, so that the list remains sorted. There can be one or more element to be added to the list, which are formed into a sorted data set themselves, and then merged according to the method with the merge operation described previously.

It will be understood that the methods and apparatuses disclosed herein may also be implemented using cluster computing. For example, an apparatus comprising a cluster of processing devices may be used where each processing devices comprises a plurality of computing cores.

Similarly, an apparatus comprising a cluster of machines may be used, each one comprising a plurality of multiple-core processing devices, each device containing a plurality of cores. Such an apparatus may correspond to an assembly comprising several GPU devices.

Optionally the number of elements in the first data set is equal to the number of data elements in the second data set. On the other hand, there is no requirement that the data sets be of equal length, and the method will work in both cases. Similarly, the method will operate correctly even if there is a large disparity in size between the two data sets, if for example one data set is considerably smaller or larger than the other. The method will work even if one of the data sets comprises only one element. In such a situation, the recursive partitioning would only be carried out on the non-unit data set.

Ideally, each data set will be partitioned into data sets of equal sizes, as this may allow optimal performance.

The present invention relates to a method and apparatus for analysing a pair of data sets with respect to a predicate, the predicate having a predicate criterion, each data set comprising one or more elements sorted according to the predicate criterion. The invention comprises recursive partitioning of the data sets in a parallel manner across multiple computing cores until a base case is reached. The invention is particularly suited for carrying out join, filter and sort operations on large data sets within database management systems.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, or characteristics, described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of analysing a first digital data set and a second digital data set in a database with respect to a predicate, the predicate including a predicate criterion, each of the first digital data set and second digital data set comprising at least one digital element sorted according to the predicate criterion, comprising:
   (a) receiving a join operation request for the database, wherein the request for the join operation includes the predicate;
   (b) partitioning each data set into a plurality of sub-groups, wherein each sub-group has an upper boundary element and a lower boundary element defining a range for each sub-group;
   (c) evaluating a probability of the predicate being satisfied by at least one element of each sub-group of the first data set and at least one element of each sub-group of the second data set, via analysis of the boundary elements of the sub-groups, wherein pairs of sub-groups are evaluated in a sub-group pairing, wherein the probability is evaluated by determining whether a range of a first sub-group in the sub-group pairing overlaps a range of a second sub-group in the sub-group pairing to define an interaction between the first sub-group and the second sub-group of sub-group pairing;
   (d) classifying a sub-group pairing as a zero probability sub-group pairing if there is a zero probability of the predicate being satisfied by the elements of the sub-group pairing, wherein zero probability sub-group pairings are excluded from further processing to provide efficient use of processing resources;
   (e) classifying a sub-group pairing as non-zero probability sub-group pairing if there is a non-zero probability of the predicate being satisfied by the elements of the sub-group pairing;
   (f) for each non-zero probability sub-group pairing, recursively repeat steps (b) to (e) until the partitioning step results in base case sub-groups for both data sets, wherein the recursions are distributed among the plurality of computing cores for parallel processing of non-zero probability sub-group parings; and
   (g) performing a predicate evaluation of the elements within each base case subgroup pairing to determine a result for the join operation.

2. A method as claimed in claim 1 comprising the additional step of generating an output digital data set, wherein the digital data set comprises the base case sub-group pairings where the predicate evaluation is true.

3. A method as claimed in claim 1 in which steps (a) to (d) are carried out by a single core in a first instance.

4. A method as claimed in claim 3 in which steps (a) to (d) are carried out by a single core in each recursion.

5. A method as claimed in claim 1 in which the base case sub-group is defined in relation to hardware on which the method will be carried out, the nature of the predicate; and the nature of the data.

6. A method as claimed in claim 1 comprising the initial step of storing the elements of at least one of the sorted digital data sets in consecutive memory address locations.

7. A method as claimed in claim 1 in which the step of partitioning comprises identifying a memory location of the upper boundary element and the memory location of the lower boundary element of a sub-group and retrieving the elements stored therein.

8. A method as claimed in claim 1 in which the processing device is a Graphics Processing Unit (GPU).

9. A method as claimed in claim 1 implemented across a cluster of computing devices, each computing device comprising a plurality of computing cores.

10. An apparatus for analysing digital data sets included in a database with respect to a predicate, the predicate including a predicate criterion, the apparatus comprising memory adapted to store a first digital data set and a second digital data set, each data set comprising one or more digital elements that are rows in a database sorted according to the predicate criterion; and at least one processing device having a plurality of computing cores; the apparatus being adapted to:
   (a) receive a request for a join operation for the database, wherein the request for the join operation includes the predicate;
   (b) partition each data set into a plurality of sub-groups, each sub-group having an upper boundary element and a lower boundary element defining a range for each sub-group;
   (c) for each sub-group of the first data set, evaluate a probability of the predicate being satisfied by at least one element of that sub-group and at least one element of each sub-group of the second data set by analysis of the boundary elements of the sub-groups, where each pair of sub-groups evaluated is referred to as a sub-group pairing, wherein the probability is evaluated by determining whether a range of a first sub-group in the sub-group pairing overlaps a range of a second sub-group in the sub-group pairing to define an interaction between the first sub-group and the second sub-group of sub-group pairing;
   (d) classify a sub-group pairing as a zero probability sub-group pairing if there is a zero probability of the predicate being satisfied by the elements of the sub-group pairing, wherein zero probability sub-group pairings are excluded from further processing to provide efficient use of processing resources;
   (e) classify a sub-group pairing as non-zero probability sub-group paring if there is a non-zero probability of the predicate being satisfied by the elements of the sub-group pairing;
   (f) for each non-zero probability sub-group pairing, recursively repeat steps (b) to (e) until the partitioning step results in base case sub-groups for both data sets, wherein the recursions are distributed among the plurality of computing cores for parallel processing of non-zero probability sub-group pairings; and
   (g) perform a predicate evaluation of the elements within each base case sub-group pairing;

(h) perform the join operation on joinable rows of pairs of rows in the base case sub-groups for both data sets where the predicate evaluation is true to identify results for the join operation.

11. An apparatus as claimed in claim 10 further adapted to generate an output digital data set comprising the base case sub-group pairings where the predicate evaluation is true.

12. An apparatus as claimed in claim 10 wherein the elements of at least one of the sorted digital data sets are stored in the memory in consecutive memory address locations.

13. An apparatus as claimed in claim 10 in which the processing device comprises a Single Program Multiple Data (SPMD) parallel computing architecture.

14. A non-transitory machine readable storage medium including instructions embodied thereon, the instructions when executed by the plurality of computing cores perform the method as set out in claim 1.

15. An apparatus for analysing digital data sets included in a database with respect to a predicate of a join operation, the predicate including a predicate criterion, the apparatus comprising memory adapted to store a first table and a second table, each table comprising one or more digital elements that are rows in a database sorted according to the predicate criterion; and at least one processing device having a plurality of computing cores; the apparatus being adapted to:

(a) receive a request for the join operation for the database, wherein the request for the join operation includes the predicate;

(b) partition each table into a plurality of sub-groups, each sub-group having an upper boundary element and a lower boundary element defining a range for each sub-group;

(c) for each sub-group of the first table, evaluate a probability of the predicate being satisfied by at least one element of that sub-group and at least one element of each sub-group of the second table by analysis of the boundary elements of the sub-groups, where each pair of sub-groups evaluated is referred to as a sub-group pairing, wherein the probability is evaluated by determining whether a range of a first sub-group in the sub-group pairing overlaps a range of a second sub-group in the sub-group pairing to define an interaction between the first sub-group and the second sub-group of sub-group pairing;

(d) classify a sub-group pairing as a zero probability sub-group pairing if there is a zero probability of the predicate being satisfied by the elements of the sub-group pairing, wherein zero probability sub-group pairings are excluded from further processing to provide efficient use of processing resources;

(e) classify a sub-group pairing as non-zero probability sub-group paring if there is a non-zero probability of the predicate being satisfied by the elements of the sub-group pairing;

(f) for each non-zero probability sub-group pairing, recursively repeat steps (b) to (e) until the partitioning step results in base case sub-groups for both tables, wherein the recursions are distributed among the plurality of computing cores for parallel processing of non-zero probability sub-group pairings; and (g) perform a predicate evaluation of the elements within each base case sub-group pairing;

(h) perform the join operation on joinable rows of pairs of rows in the base case sub-groups for both tables where the predicate evaluation is true to provide results for the join operation.

\* \* \* \* \*